June 30, 1931.  M. Y. KACHLINE  1,812,535

METHOD AND MEANS FOR APPLICATION OF PARADICHLOROBENZENE TO FRUIT TREES

Filed May 26, 1930

INVENTOR.
M. Y. Kachline,

ATTORNEY

Patented June 30, 1931

1,812,535

UNITED STATES PATENT OFFICE

MORRIS Y. KACHLINE, OF BANGOR, PENNSYLVANIA

METHOD AND MEANS FOR APPLICATION OF PARADICHLOROBENZENE TO FRUIT TREES

Application filed May 26, 1930. Serial No. 455,915.

The conventional method of applying paradichlorobenzene (crystal gas) to peach trees for the eradication of the devastating borer consists in scattering it, in the approximate quantity of one ounce per tree, around the base of the tree about one-fourth to one-half an inch from the bark in a space approximately one inch wide, the ground around the tree having been previously prepared by leveling the surface and removing all the weeds and trash. The material having been spread, it is then covered with dirt mounded around the base of the tree, the gas then penetrating to the borers and killing them. This plan exposes the operator to sickening odors to which he is subjected for a comparatively long time in the operation on any one tree.

The present invention has for its object the preparation of paradichlorobenzene in a container with which the base of the tree may be encircled and over which the earth may be placed as previously, thus reducing the time for the placement of the paradichlorobenzene to a minimum and avoiding its obnoxious odors.

With this object in view, the invention consists in a construction of which a preferred embodiment is illustrated in the accompanying drawings, wherein:—

Figure 1:
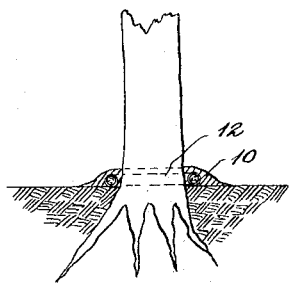
Figure 1 is a view partly in section and partly in elevation, illustrating the trunk of a tree with the invention applied in operative position.
Figure 2:
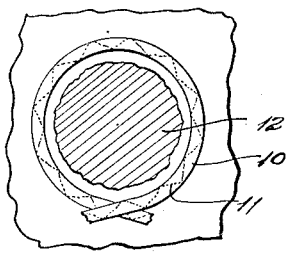
Figure 2 is a plan view of the structure of Figure 1, the tree trunk being shown in section.
Figure 3:
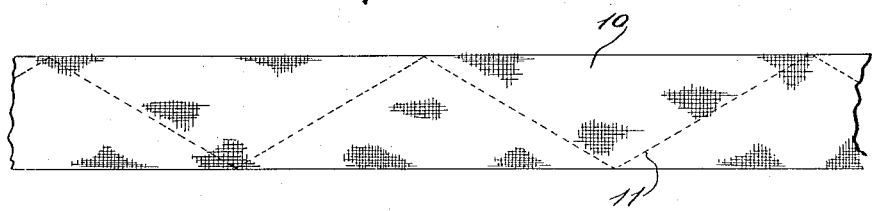
Figure 3 is an elevational view of the invention in extended form.
Figure 4:
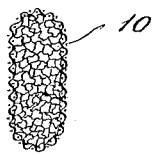
Figure 4 is a transverse sectional view of the structure of Figure 3.

In the illustrated embodiment of the invention a fabric tube 10, preferably of cheese cloth, is prepared of any desired length, for example thirty or forty feet, the cross sectional diameter of the tube being approximately three quarters of an inch. It is then charged with paradichlorobenzene in the amount of approximately one ounce of the latter to each running foot of the former, being distributed uniformly throughout the length of the tube and such uniform distribution maintained by a sinuous line of stitching 11 extending through the tube and running throughout the length of the latter.

The tree to be treated, has the ground immediately adjacent the base of the trunk 12 cleared of refuse and smoothed off, when a portion of the tubing is disposed in encircling relation to the trunk from one-fourth to one-half inch from the latter. It is then covered over with a slight mound of earth as in the old method, that portion of the tube encircling the trunk having been severed from the remainder. The gas is effective in the eradication of the borer as in the old method.

By preparing a long tubular fabric container for the paradichlorobenzene, the latter may be quickly placed, so that the work of attending a quantity of trees is reduced to a minimum and the operator saved from the disagreeable effects, as when the material is naturally loose.

As an alternative to the cloth tube, there may be used a woven wire tube with which may be used also the line stitching to maintain the uniform distribution of the material throughout the tube.

A second modification may consist of a small rope or band of fiber which is saturated with the material in the amount of approximately one ounce per running foot.

The invention having been described, what is claimed as new and useful is:—

A means for treating fruit trees with paradichlorobenzene which comprises a tubular fabric carrier uniformly charged with the material throughout its length, and a sinuous line of stitching extending through the tube to maintain uniform distribution of the material.

In testimony whereof he affixes his signature.

MORRIS Y. KACHLINE.